US011946312B2

(12) United States Patent
Woolery

(10) Patent No.: US 11,946,312 B2
(45) Date of Patent: Apr. 2, 2024

(54) TILT-TO-CLEAN-IN-ALL-WEATHER WINDOW WITH HIDDEN INSECT SCREENING

(71) Applicant: Donald R. Woolery, Rockford, IL (US)

(72) Inventor: Donald R. Woolery, Rockford, IL (US)

( * ) Notice: Subject to any disclaimer, the term of this patent is extended or adjusted under 35 U.S.C. 154(b) by 0 days.

(21) Appl. No.: 18/130,554

(22) Filed: Apr. 4, 2023

(65) Prior Publication Data

US 2023/0392433 A1 Dec. 7, 2023

(51) Int. Cl.
*E06B 3/34* (2006.01)
*E06B 9/44* (2006.01)

(52) U.S. Cl.
CPC ................ *E06B 3/341* (2013.01); *E06B 9/44* (2013.01)

(58) Field of Classification Search
CPC ........... E06B 3/341; E06B 3/5063; E06B 9/44
See application file for complete search history.

(56) References Cited

U.S. PATENT DOCUMENTS

| | | | | |
|---|---|---|---|---|
| 1,349,438 A * | 8/1920 | Samplawski | E06B 9/54 | 160/180 |
| 1,909,640 A * | 5/1933 | Tomlinson | E06B 9/44 | 160/251 |
| 6,167,936 B1 * | 1/2001 | Stover | E06B 9/66 | 160/100 |
| 9,863,180 B2 * | 1/2018 | Haberland | E05D 15/36 | |
| 9,932,769 B2 * | 4/2018 | Woolery | E06B 9/54 | |
| 2005/0072075 A1 * | 4/2005 | Maier | E06B 3/44 | 52/204.5 |
| 2007/0199665 A1 * | 8/2007 | Studney | E06B 9/54 | 160/99 |
| 2018/0010387 A1 * | 1/2018 | Woolery | E06B 7/2312 | |

* cited by examiner

*Primary Examiner* — Christine T Cajilig

(57) ABSTRACT

A single-hung tilt-to-clean window frame of otherwise standard configuration is furnished with a non-sliding upper sash and a vertically sliding lower sash with each sash having typical tilt-to-clean hardware. When the lower sash is opened and adjusted up/down, insect screen (331) attached to the bottom of the lower sash is dispensed from a self-storing roller unit (330) hidden inside the window sill, automatically filling the ventilation aperture. Thus, vision-restricting screening is out of sight until actually required. Also, the cold wind, muggy air or precipitation that can hinder cleaning operations are blocked by an impervious membrane (334) stretched over the window's opening, before cleaning begins, by way of a handle (343) attached to cables (340) pulling a rod (336) moving a tube (335) placed behind a fold in the membrane.

2 Claims, 5 Drawing Sheets

TILT-TO-CLEAN-IN-ALL-WEATHER WINDOW WITH HIDDEN INSECT SCREENING

BACKGROUND

In tilt-to-clean windows as currently manufactured, when sashes are tilted for cleaning, the only barrier between the room and the outside weather is insect screen fabric, which is pervious to rain, snow, hot winds, cold and humidity. This limits the times desirable for cleaning the windows. The design submitted herewith resolves that issue: To clean the windows, even in inclement weather, all that is required to block off the entire window opening from the weather is to pull on a cable grip conveniently clipped to the sill, which draws an impervious membrane across the outside face of the window.

In addition to satisfying the above need, the window design submitted herewith limits the visible presence of view-restricting screens to the times when a window is open for ventilation and screening is actually needed to protect occupants from flying insects.

This application continues development of the ideas presented in my U.S. Pat. No. 9,932,769 and my USPTO Application Ser. No. 17/975,573.

BRIEF DESCRIPTION

In a single-hung, tilt-to-clean window frame of standard configuration, said frame is fitted with a non-sliding upper sash and a vertically sliding lower sash, wherein lifting of the lower sash for ventilation pulls screen fabric off a spring-loaded self-storage roller concealed in a cavity in the sill. That action forms a barrier against flying insects between the edge areas along each vertical side of the screen and the weatherstripping fitted along the shoulders provided in the frame weatherward of the lower sash, the length of said screen fabric being at least as great as the travel of the lower sash, which fabric is attached to and immediately precedes a membrane impervious to wind and precipitation.

When it is time to clean the windows, both sashes are closed and a rigid horizontal tube resting at the juncture of the lower sash and the sill, proximate to the room side of the screen, is pulled across the top of the sill to the weather side of the window by way of a rigid rod passing thru said tube, each end of said rod being drawn along a guide groove recessed into each of the two opposing jambs by a cable at each of said rod's ends, each said cable being routed from said rod, through the frame, up to the head and down to the center of the room side of the sill, where the two cables are attached to a grip handle clipped to the sill, the grip handle remaining clipped to the sill during the window's normal ventilation mode. Pulling the unclipped grip handle away from the sill pulls the cables until the rod in the tube comes proximate to the outside face of the frame, at which time the guide grooves in the jambs direct the rod to travel vertically upward to the head, which causes the screen fabric to be pulled up towards the head, with said membrane following. As said tube rises, the screen fabric moves over the tube, traveling from the weather side to the room side of the tube, bringing the membrane's edge areas over the weather side faces of the jambs until the tube contacts the head, whereupon said rod is latched to prevent further travel, which establishes a temporary closure all across the window, blocking out flying insects and inclement weather. (Cleaning of the sashes is then accomplished as is customary for tilt-to-clean windows.)

In a second embodiment the impervious membrane is followed off the self-storing roller by a second section of screen fabric, allowing light-restricting characteristics of the membrane to provide shade to the window and allowing, after the membrane is set in place, for the lower sash to be raised and to provide natural ventilation as desired.

ADVANTAGES

The advantages are several, in particular:

With respect to conventional, tilt-to-clean windows, cleaning the sashes' exteriors can be accomplished without ever enduring the troubles of disagreeable weather.

With respect to conventional, fixed-in-place screening, visibility through the window is increased since the degradation of visibility that comes with looking through screens is reduced to only the times a window sash is actually open for ventilation and even then the degradation of visibility is limited to the area of the ventilation opening and not the entire viewing area as is common to many screening systems.

With respect to conventional, fixed-in-place screening, the undesirable affinity of insect screens to collect atmospheric dust and pollutants, that can limit visibility and decompose screen fabric, is limited to only the times a window sash is open.

With respect to conventional, fixed-in-place screening, the screen fabric is subjected to the degrading UV rays of the sun only when a window sash is open.

With respect to conventional, fixed-in-place screening, the designs disclosed herein eliminate the objections of those who dislike seeing building exteriors having windows covered over with dark, dirty screens.

With respect to many conventional, fixed-in-place screening, the design disclosed herein prevents the loss of screens to strong winds.

With respect to screening systems afforded by attaching storm-windows to in-situ windows, the design disclosed is more convenient to operate.

With respect to screening systems afforded by attaching storm-windows to in-situ windows, visual clutter is reduced since the assembly disclosed herein retains the insect screens as part of the window itself.

With respect to screening systems afforded by attaching storm-windows to in-situ windows, fewer glass and sash surfaces require cleaning.

With respect to providing shade from the sun, the second embodiment provides more efficient heat protection than the use of interior shades since its barrier to sunlight is to the sunny side of the glazing, where it does not trap heat between the glazing and the shade material.

REFERENCE NUMERALS

Figure 1:
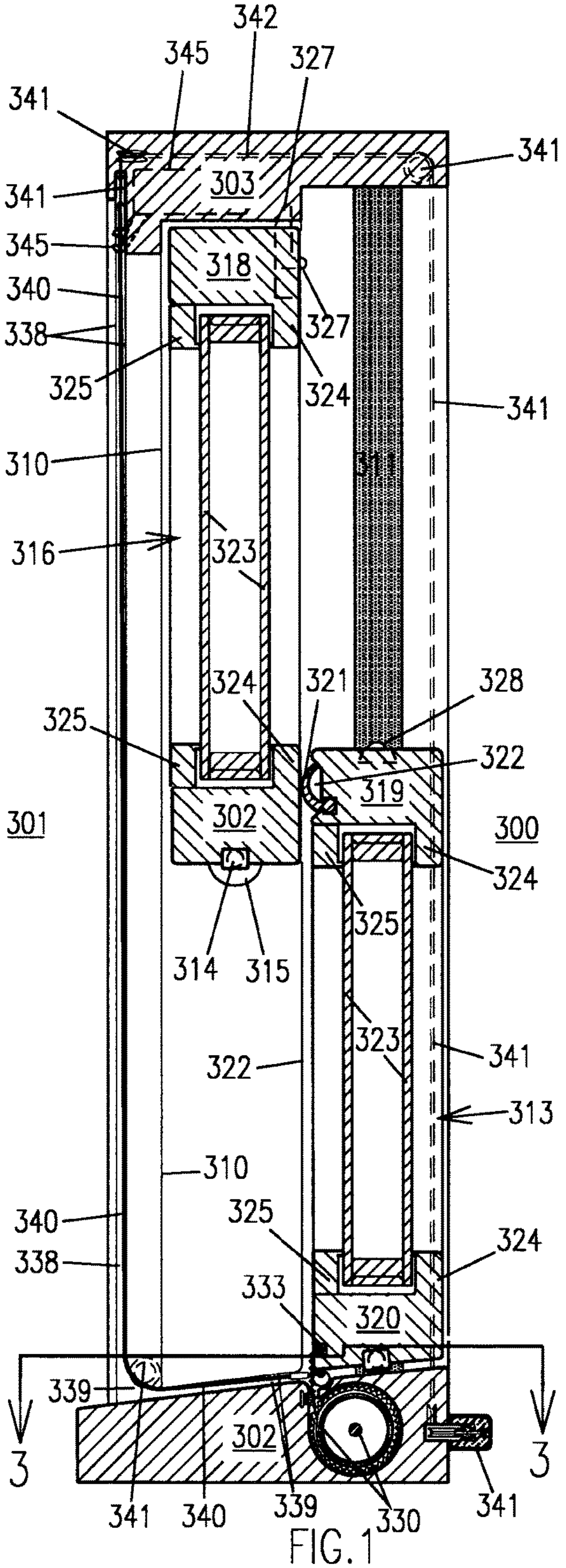
FIG. 1 is a vertical section of the window with both sashes closed.

300 room side
301 weather side
302 sill member
303 head member
304 sill cavity
305 sill cavity seal
306 longitudinal sill opening
307 jamb member
308 weather obstructing shoulder for lower sash
309 weatherstripping
310 weather obstructing shoulder for upper sash
311 trackway for lower sash guide
312 lower sash pivot/guide assembly
313 lower sash
314 upper sash pivot axle
315 upper sash pivot receiver
316 upper sash
317 bottom rail of upper sash
318 top rail of upper sash
319 top rail of lower sash
320 bottom rail of lower sash
321 flexible baffle
322 recess for flexible baffle storage
323 glazing
324 fixed glazing stop
325 removable glazing stop
326 lower sash tilt latch
327 upper sash tilt latch
328 finger control for lower sash tilt latch
329 finger control for upper sash tilt latch
330 self-storing roller unit
331 insect screen fabric
332 edge of insect screen
333 insect screen attachment
334 impervious membrane
335 rigid tube
336 rigid rod
337 rod guide groove
338 vertical segment of rod guide groove
339 passageway
340 cable
341 cable guide
342 cableway
343 cable grip
344 second section of screen fabric
345 head latching

DETAILED DESCRIPTIONS OF DRAWINGS

FIG. 1: This vertical section shows the window with sashes 313 and 316 closed, with the insect screen fabric 331 stored out of view on the self-storing roller unit 330 and the flexible baffle 321 collapsed into a recess 322. Also shown are the vertical portions of cables 340 and cableways 342 as they are routed from the cable grip 343 up to the head 303 and across said head, down through the vertical section of rod guide groove 338 and through passageway 339 for attachment to the rigid rod 336 (as detailed in FIG. 5 and FIG. 6). Note that head latch 345 depicts one of numerous arrangements the latching mechanism may have, the latching shown being based on a push-to-engage/push-to-release designed latch engaging each end of said rigid rod. Also, note that in this drawing, as in the other drawings, the heights of the sashes have been compressed in order to economize the drawings. Note further that in this drawing, as in the other drawings, the weatherstripping commonly furnished to windows is not shown, in order to simplify the illustrations, except where such weatherstripping contributes to the functioning of the design submitted herewith.

Figure 2:
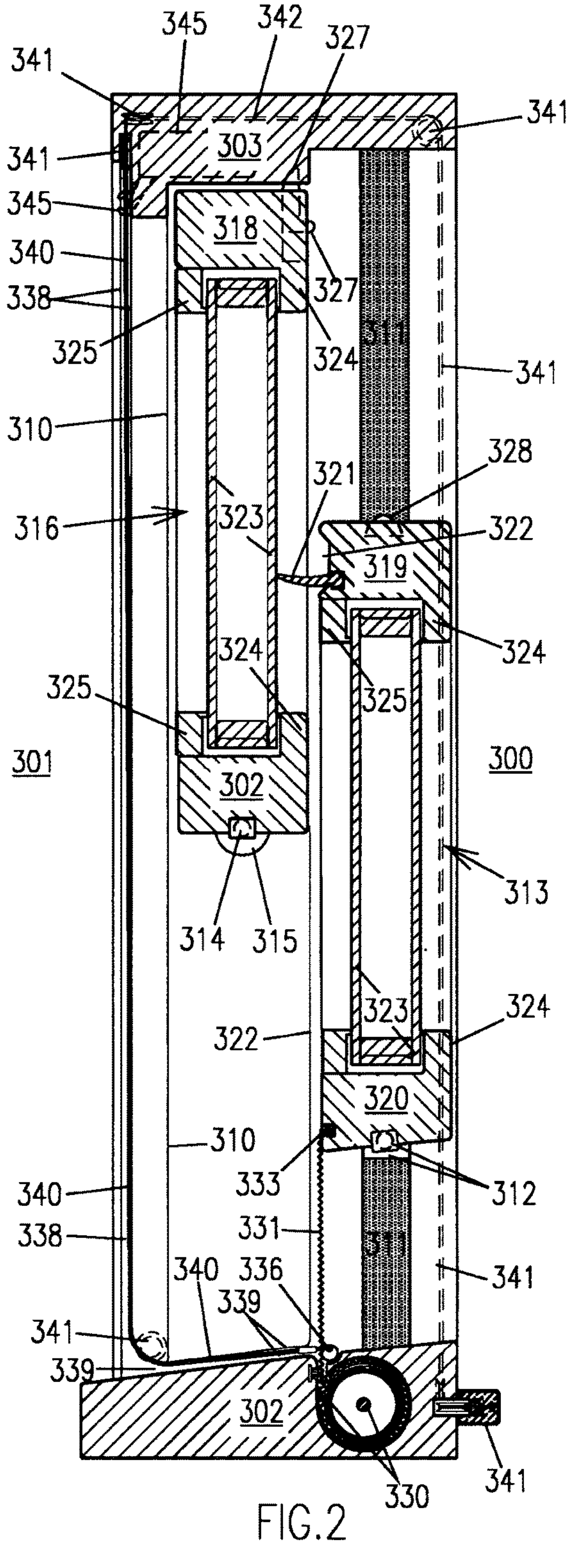
FIG. 2 is a vertical section of the window with the lower sash open for ventilation.

FIG. 2: This vertical section shows the window open for ventilation, the lower sash 313 having been raised, which allows the flexible baffle 321 to extend and fill in the gap between the glazing 323 in the upper sash 316 and the lower sash's top rail 319. The insect screen fabric 331 has deployed from the self-storing roller unit 330 and, being attached to the weather side face of the lower sash's bottom rail 320, has formed a barrier against flying insects as it covers the lower sash's weather shoulder 308 formed in the jamb 307.

Figure 3:
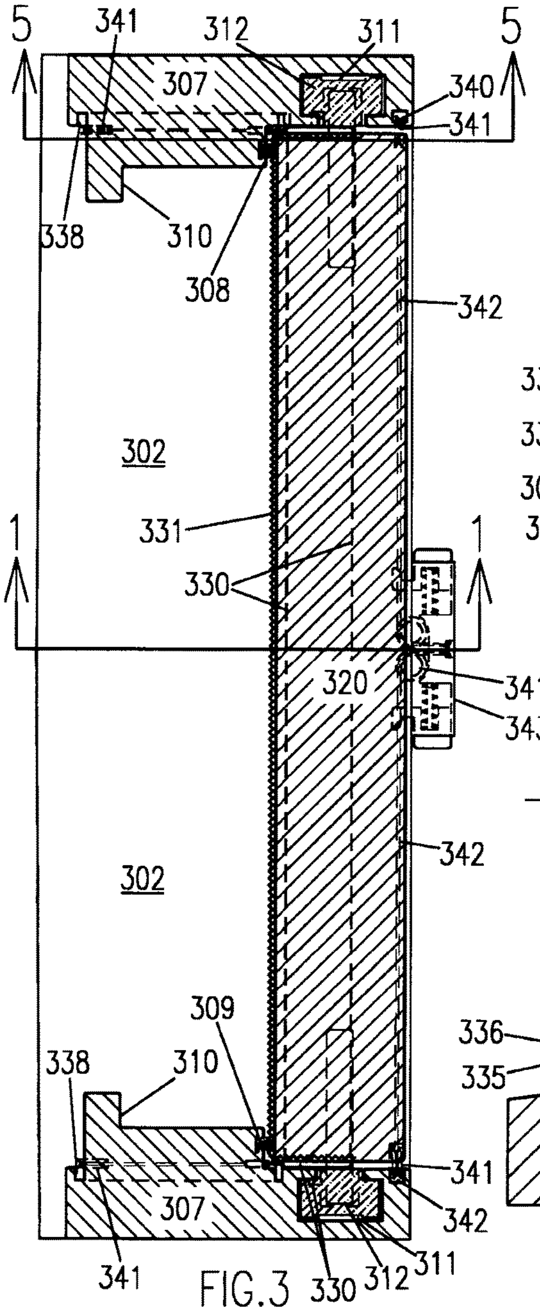
FIG. 3 is a horizontal section of the window, just above the sill, with both sashes closed.

FIG. 3: This horizontal section shows a conceptual profile of each jamb, including the step for the shoulder hindering weather intrusion at the upper sash 310 and the step for the shoulder hindering weather intrusion at the lower sash 308, as well as the vertical portion of the rod guide groove 338 and trackway 311 for guidance of the lower sash's pivot/guide assembly 312. (Note that the balancing hardware normally provided to control movement of said lower sash is not shown.) Also shown is the lower sash 313—located above the self-storing roller unit 330—with its pivots extended into their respective pivot/guide assemblies 312 as well as the detachable cable grip 343—which is shown here in one of many of its possible configurations, this one consisting of two opposing spring-loaded buttons which when manually squeezed towards each other cause their opposing hooks to release said grip component from a cavity in the room side of the sill 302, allowing the grip component to be pulled away from said sill and to pull cables 340, said cables being guided by cableways 342 and cable guides 341.

Figure 4:
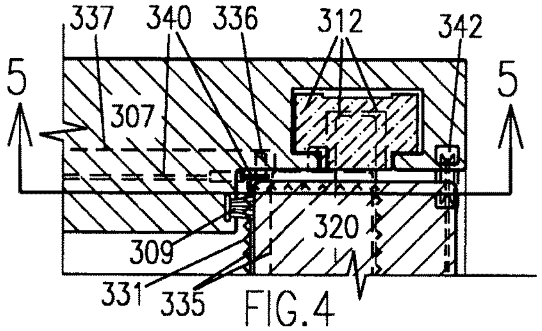
FIG. 4 is a partial enlargement of FIG. 3.

FIG. 4: This detail view of a portion of FIG. 3 shows the window during its ventilation mode, with the screen fabric 331 forming a barrier against flying insect intrusion by being brought against the weatherstripping 309 fitted to the lower sash's jamb shoulder 308. This detail also shows the rigid rod 336 in its not-in-action position, with a cable 340 wrapped around said rod's end, said end being located in rod guide groove 337.

Figure 5:
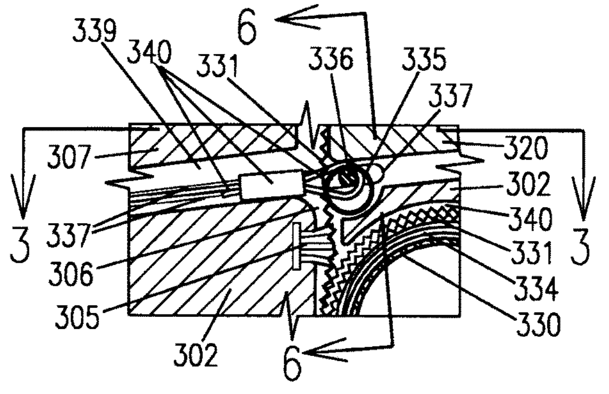
FIG. 5 is a detailed vertical section of the intersection of the lower sash and the sill.
Figure 6:
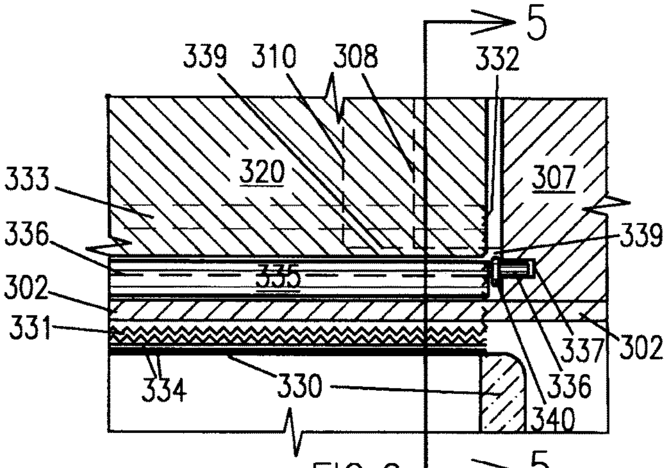
FIG. 6 is a detailed vertical cross-section at the intersection of the lower sash and the sill.

FIG. 5: This vertical section, a detailed view of FIG. 6, shows the screen fabric 331 stretched between the weather side face of the lower sash 313 and the self-storing roller unit 330 with the lower cavity seal 305, near the longitudinal sill opening 306, blocking the intrusion of flying insects. Also shown is a cable 340 wrapped around an end of the rigid rod 336 running through rigid tube 335, which rod is guided by rod guide groove 337 as said rod moves said tube through passageway 339 horizontally recessed into the jamb 307.

FIG. 6: This detail vertical cross-section through the intersection of the sill 302 and lower sash 313, when said sash is closed, shows the self-storing roller unit 330, in the sill cavity 304, wrapped with screen fabric 331 and impervious membrane 334, with the rigid tube 335 in its not-in-action position to the room side of said fabric and rigid rod 336 passing through said tube and said rod's end located in its rod guide groove 337. Beyond the lower sash is the jamb shoulder for the upper sash 310 and the jamb shoulder for the lower sash 308, which shoulders are cut through with a passageway 339 to allow said tube to pass to the window's weather side. Note that the intersection shown between the sill 302 and the jamb 307 is entirely diagrammatic.

Figure 7:
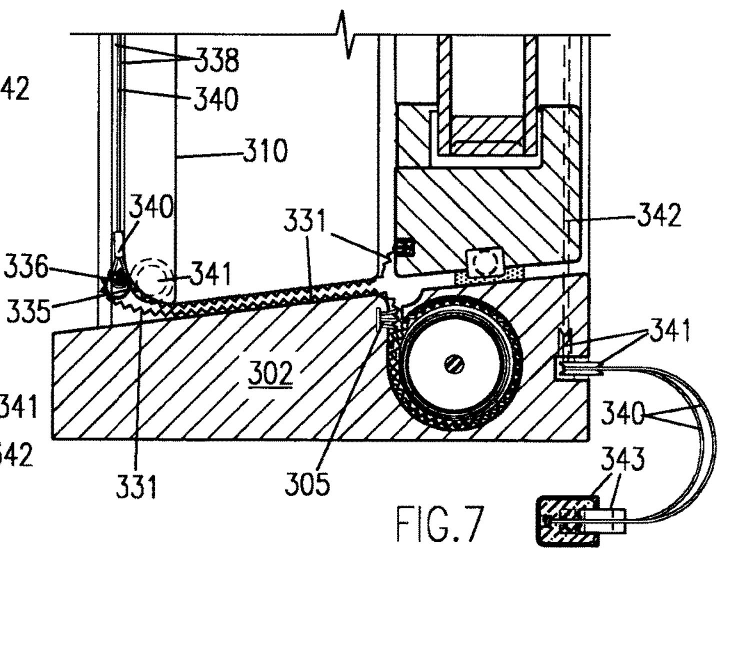
FIG. 7 is an enlarged detail vertical section of the lower window as the screen/membrane begins being extracted to close off the window for cleaning.
Figure 8:
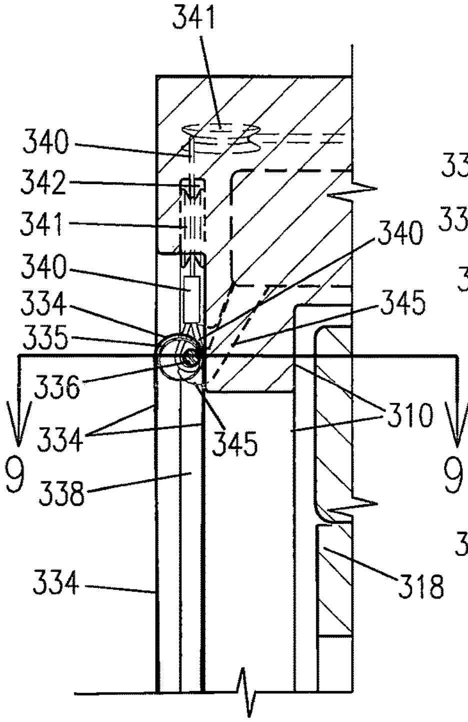
FIG. 8 is a partial enlargement of FIG. 10.

FIG. 7: This detail vertical section shows the cable grip 343 having been released from the sill 302 and pulled sufficiently away from the sill as to draw, by way of cables 340, the rigid rod 336 and rigid tube 335 along a rod guide groove 337 to the vertical section of rod guide groove 338, the movement of said rod and tube being facilitated by a cable guide 341, appropriately configured. Said movement draws the screen fabric 331 through the passageway 339 recessed into the jamb shoulders 308 and 310 and across the sill 302, FIG. 8: This detail vertical section, an enlargement of an upper portion of FIG. 10, shows the rigid rod 336 and rigid tube 335 after being drawn up to the head 303 by way of the cables 340 and cable guides 341, said tube bringing the impervious membrane 334 into contact with the head where each end of the rod in said tube is shown captured by a latch of the push-to-capture/push-to-release type, thus forming a temporary closure against inclement weather and flying insects.

Figure 9:
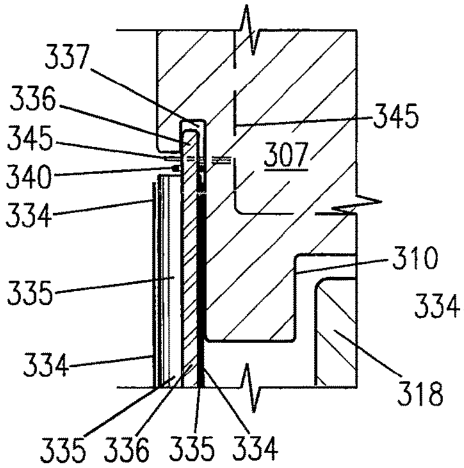
FIG. 9 is a partial and enlarged cross-section of FIG. 8.

FIG. 9: This detail cross-section shows how the closure against inclement weather and flying insects is obtained as the rigid tube 335, directed by the rigid rod 336 having its end riding in the vertical rod guide groove 338, causes the impervious membrane 334 to overlap the exterior face of a jamb 307.

Figure 10:
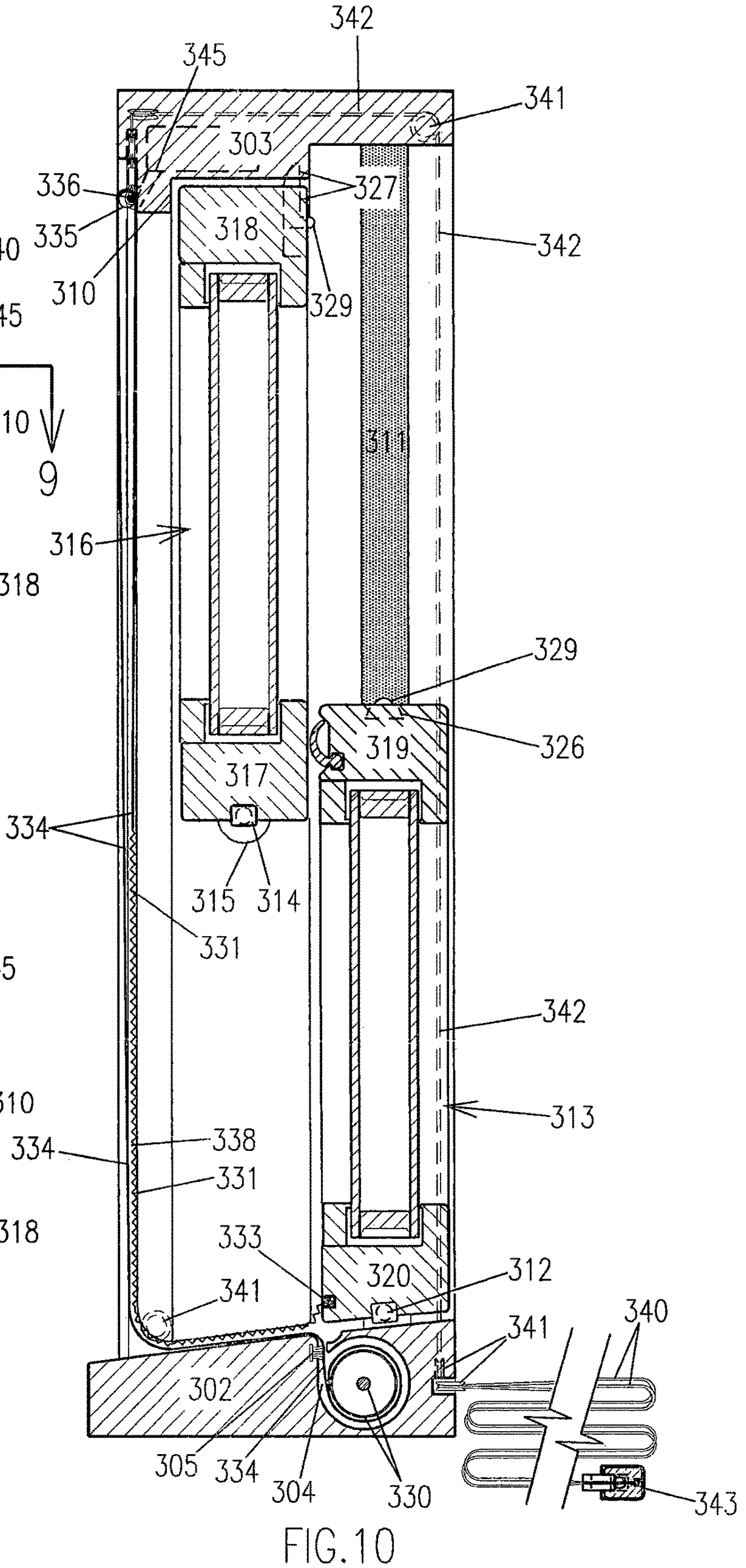
FIG. 10 is a vertical section of the window with the membrane closure in place.

FIG. 10: This vertical section shows the cable grip 343 fully extended away from the sill 302, having pulled the cables 340 through their cableways 342 so as to bring the rigid rod 336 with the rigid tube 335 from sill 302 to the head 303, by way of the vertical section of rod guide groove 338, thus stretching the impervious membrane 334 from sill to head across the entire window opening.

Figure 11:
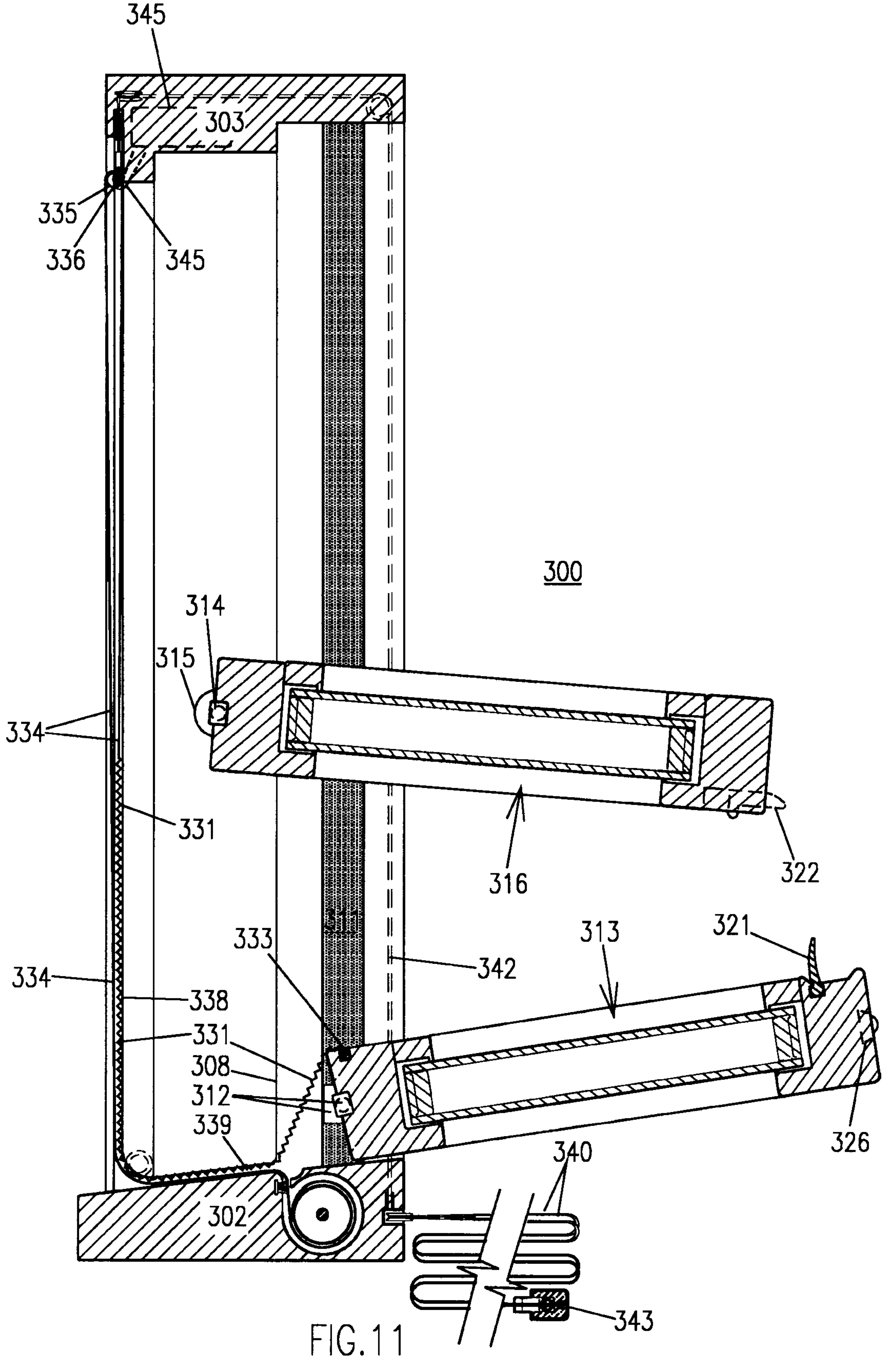
FIG. 11 is a vertical section of the window with both sashes tilted for cleaning.

FIG. 11: This vertical section shows the sashes tilted for cleaning after placement of the impervious membrane 334 as shown in FIG. 10. Note that though tilting of the lower sash causes the screen fabric 331 to be displaced from its location shown in FIG. 10, such displacement isn't injurious to the weather/insect barrier.

Figure 12:
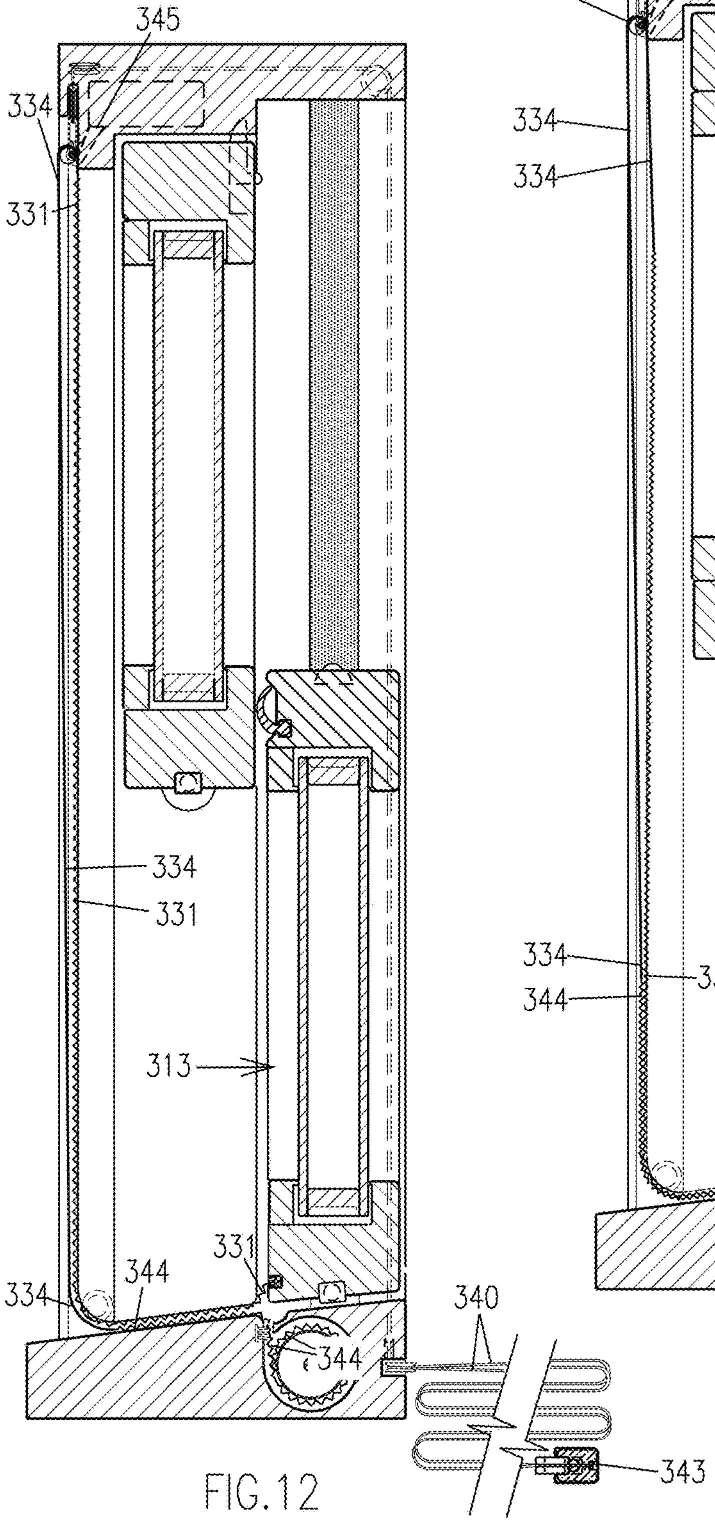
FIG. 12 is a vertical section of a second embodiment with the membrane closure in place.

FIG. 12: This vertical section of the second embodiment shows the impervious membrane 334 closing off the total window opening, as in FIG. 10, except that the screen fabric 331 is extended from the lower sash 313, across the sill 302 to the head 303 and the membrane 334 extends only from the head to the sill, where the trailing end of the membrane, at the sill, is followed by more screen fabric 344.

Figure 13:
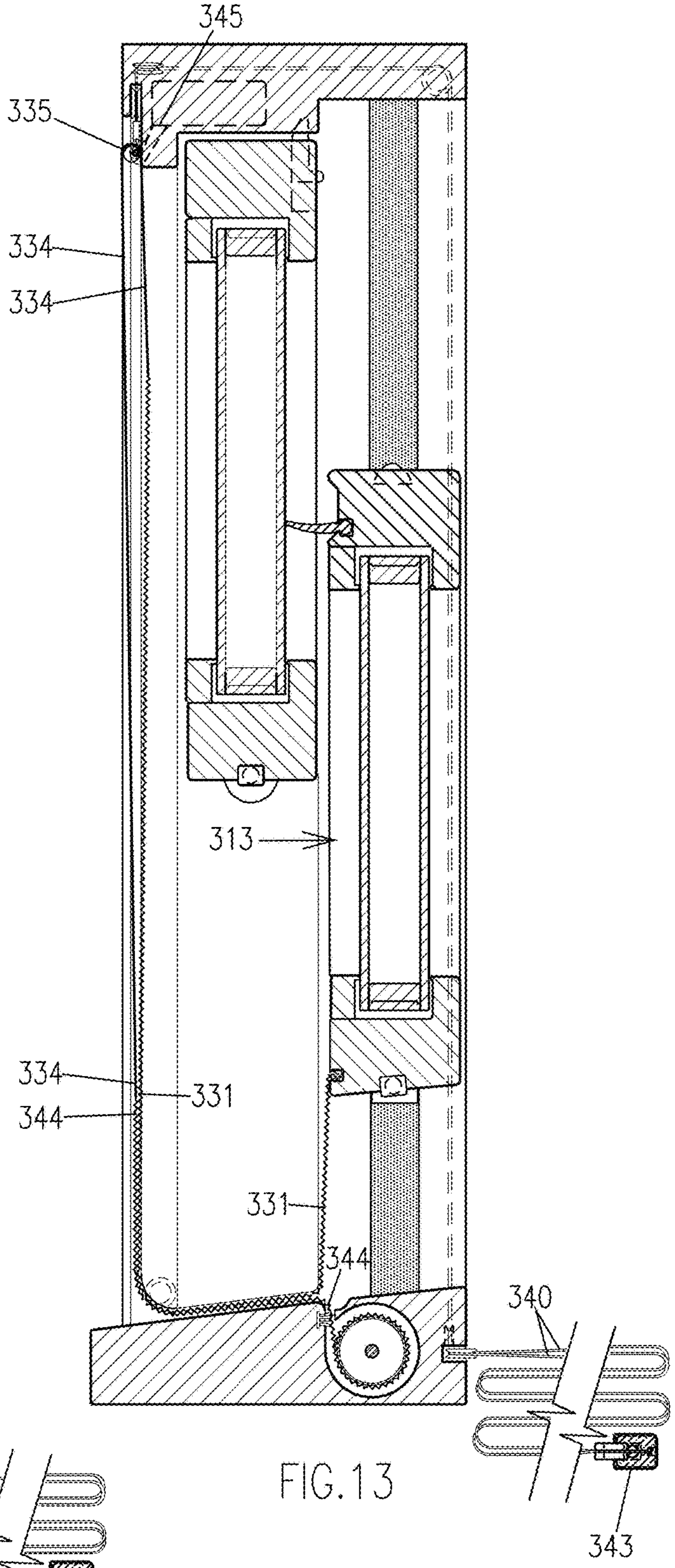
FIG. 13 is a vertical section of a second embodiment with the membrane closure in place and the lower sash raised for ventilation.

FIG. 13: This vertical section of the second embodiment shows the impervious membrane set in place, as for cleaning of the sashes, with lower sash 313 raised for ventilation, which moving of said sash has drawn the intersection of the membrane 334 with the additional screen fabric 344 upward, making way for ventilation air to flow in from the outside.

OPERATION

In the window's ventilation mode, raising the lower sash 313 up from the sill 302 causes screen fabric 331 to be dispensed from the spring-loaded self-storing roller unit 330, completely filling the ventilation aperture even as said aperture may be adjusted from time to time. When said sash is lowered to close the window, the spring in the self-storing roller unit retracts the screen fabric and rolls it up onto said unit for storage. Adjustments to increase or decrease the ventilation work similarly.

When it is time to clean the exteriors of the sashes' glazing, lower sash 313 is placed tight to the sill 302 to ensure exclusion of flying insects. Then cable grip 343 is manually detached from the sill and manually pulled away from the sill until the cables 340 connected to each end of rigid rod 336 cause said rod, passing through rigid tube 335, to force said loosely fitted tube to travel across the sill and up the jambs until said tube is met by the head 303, said rod being guided by rod guide grooves 337 and vertical sections of rod guide grooves 338. Said rod is then prevented from further travel by a latch or latches 345. In this manner impervious membrane 334 closes off the opening surrounded by said window frame.

Then the bottom sash is raised above the sill a distance as will accommodate the tilting of the lower sash. The sashes are then tilted and cleaned according to the window manufacturer's instructions.

When cleaning is complete, the sashes are returned to their default vertical positions, as is standard for tilt-to-clean windows, with the lower sash placed tight to the sill. Then said cable grip is pulled the short distance required to release the latching holding the rod. Should said roll up unit be of a common arrangement controlled by a pawl, the configuration of said latches shall provide sufficient movement of said rod for release of said pawl. With release of said latches, the spring in said self-storage roller unit draws the impervious membrane, and the screen fabric attached to said membrane, back onto said roller unit for storage while also drawing said cable grip back to the sill where said grip may be manually reattached to said sill.

In the second embodiment, operation is the same as for the first embodiment except that when the sashes are to be cleaned and it is desired to exclude wind, the lower sash is carefully raised only as far as necessary to free said sash for rotation without interference from the sill, and except that the additional feature of providing shade to the window when an occupant so desires is executed by performing the same operation as drawing the impervious membrane across the window opening in preparation for sash cleaning. Also, after the membrane is latched into place and ventilation is desired, raising the lower sash draws the impervious membrane upward which in turn places screen fabric across the window opening to approximately the same height above the sill as the sash is raised above the sill.

CONCLUSION, RAMIFICATIONS AND SCOPE

Accordingly, the reader will see that, because of the apparatus described, a single-hung window of the tilt-to-clean variety can be comfortably cleaned irrespective of blowing rain or other inclement weather conditions, as well as furnish clearer views to room occupants while conveniently protecting against intrusion of flying insects when the moving sash is opened for ventilation, said protections being furnished by an impervious membrane and by insect screen fabric stored out of sight on a spring-loaded, self-storing roll-up unit in the window frame's sill construction and said membrane being drawn across the entire window opening by a grip handle—connected to cables attached to a traveling tube arrangement—being manually pulled into the room. Thus, the convenience of tilt-to-clean windows is enhanced by providing more convenient opportunities for cleaning the glazing, as well as, by providing clearer views for room occupants, particularly when the sashes are closed and insect screens are not needed.

Although the descriptions above provide much specificity, they should not be construed as limiting the scope of the embodiments but as merely providing illustrations of several embodiments. For example, the singular cable grip could be replaced by a pair of pulls, each stored in a recess in each of the window's jambs during the window's ventilation mode.

What is claimed is:

1. An apparatus comprising:

a single-hung, tilt-to-clean window having an upper sash and a lower sash operable within a window frame;

said window frame being rectangular with a horizontal head member having one end rigidly connected to an upper end of a first vertical window jamb, an opposing second end rigidly connected to an upper end of a second vertical window jamb, and a horizontal sill member rigidly connected between respective lower ends of said window jambs;

said upper sash being rectangular with a planar upper glazing, with the perimeter edges of said upper glazing surrounded by an upper sash frame, said upper sash frame consisting of a first horizontal top rail having a first end rigidly connected to an upper end of a first vertical upper sash stile and an opposing second end rigidly connected to an upper end of a second vertical upper sash stile with a first horizontal bottom rail rigidly connected between respective lower ends of said upper sash stiles;

said upper sash frame being pivotally attached to said first and second jambs by a first upper sash pivot axle fixed to the bottom of the first end of said first bottom rail and by a second upper sash pivot axle fixed to the bottom of a second opposing end of said first bottom rail, said first axle being engaged by a first pivot receiver fixed into said first jamb and said second axle being engaged by a second pivot receiver fixed into said second jamb, with said upper sash being held upright in said window frame, against rotation about said pivots, by one or more upper sash tilt latches;

said lower sash being rectangular with a planar lower glazing, with the perimeter edges of said lower glazing surrounded by a lower sash frame, said frame consisting of a second horizontal top rail having a first end rigidly connected to an upper end of a first vertical lower sash stile and an opposing second end rigidly connected to an upper end of a second vertical lower sash stile with a second horizontal bottom rail rigidly connected between respective lower ends of said lower sash stiles;

said lower sash frame being, when measured from the most-lateral face of said lower sash first stile to the most-lateral face of said lower sash second stile, approximately one inch greater than the respective measurement for said upper sash, with the bottom of the first end of said second bottom rail having a first lower sash pivot axle pivotally attaching said lower sash to a first lower sash pivot/guide assembly slidingly retained in a first trackway recessed into said first jamb and with the bottom of the opposing second end of said second bottom rail having a second lower sash pivot axle pivotally attaching said lower sash to a second lower sash pivot/guide assembly slidingly retained in a second trackway recessed into said second jamb, the weight of said lower sash on said pivot/guide assemblies being counterbalanced, with said trackways being aligned such that said lower sash travels to the room side of said upper sash, all with said lower sash being held upright in said window frame, against rotation about the pivots in said pivot/guide assemblies, by one or more lower sash tilt latches;

said first jamb having a stepped cross-section formed by:

a first vertical surface oriented perpendicular to the plane of said lower sash glazing and located parallel to and lateral from said most-lateral surface of said first lower sash stile;

a second vertical surface parallel to said first vertical surface and approximately one-half inch closer to the center of said upper and lower sashes, and thereby being parallel to and lateral from said most-lateral surface of said first upper sash stile;

a first shoulder, formed by a third vertical surface between and normal to said first and second vertical surfaces, defining a first step in said first jamb, which step, being adjacent to the weather-ward face of said lower sash, serves to mitigate against wind blowing into the gap located between said first vertical surface and said lower sash;

a second shoulder, formed by a fourth vertical surface approximately one-half inch in breadth and normal to said second vertical surface, defining a second step in said first jamb, which step, being adjacent to the weather-ward face of said upper sash, serves to mitigate against wind blowing into the space located between said second vertical surface and said upper sash;

said second jamb having a cross-section mirroring the cross-section of said first jamb;

a flexible baffle comprising a flexible fin member, said flexible baffle being attached to said upper sash or said lower sash in a horizontal longitudinal cavity provided between said first bottom rail of said upper sash and said second top rail of said lower sash when said sashes are each in a closed position, said flexible fin member remaining flexed within said cavity until said lower sash is moved into a ventilating position and said second top rail of said lower sash rises above said first bottom rail of said upper sash, whereupon said flexible fin member un-flexes and extends horizontally to continuously contact, if attached to said upper sash, said lower glazing and said vertical stiles of said upper sash, or, if attached to said lower sash, to continuously contact said upper glazing and said vertical stiles of said lower sash, thereby sealing off the opening between said upper sash and said lower sash;

a screen rollup assembly comprising a section of insect screen fabric, a section of impervious membrane and a shafted self-storing roller unit;

said roller unit, having said shaft furnished with a spring to rotate said shaft, is mounted inside of and spanning a length of a longitudinal cavity within said sill;

said section of insect screen fabric, having a top horizontal end attached along the weather-side face of said lower sash's bottom rail is furnished with a width matching the width of said lower sash and a length at least as great as the maximum distance said lower sash may travel for ventilation;

said section of impervious membrane, being impervious to wind and precipitation, has a top horizontal end attached to said insect screen fabric's bottom horizontal end and a bottom horizontal end attached to said rollup shaft, the width of said section of impervious membrane matching the width of said section of insect screen fabric, and the length of said impervious membrane being at least as great as the distance between said sill and said head, all such that the sum total length of said section of insect screen fabric and the attached section of said impervious membrane equals at least twice the height of the window opening from head to sill plus twice the width of said head member from weather-side to room-side;

wherein the assembly of said insect screen fabric and impervious membrane is configured to unroll from said rollup shaft as said lower sash is moved vertically away from said sill member, from a closed position to a ventilation position, or as said lower sash is titled out of said window frame for cleaning of the exterior surfaces of said lower glazing, said assembly also being configured to roll back onto said rollup shaft when said lower sash is lowered from said ventilation position to said closed position and when said lower sash is tilted from its tilted-for-cleaning position back to its typical vertical position;

a horizontal straight rigid tube located, when said lower sash is closed, proximate to where the weather-side face of the bottom of said lower sash is proximate to said sill, with said tube being to the room-side of said insect screen fabric;

a straight rigid rod running through said tube, said rod having a first end engaged by a first rod guide groove located at the intersection of said first jamb and said sill, with said first rod guide groove being extended, by a first curved section of groove, to a first vertical groove in said first jamb, making a continuous groove from said weather-side face of said lower sash up to said head member, and said rod having an opposing second end engaged by a second rod guide groove located at the intersection of said second jamb and said sill, with said second rod guide being extended, by a second curved section of groove, to a second vertical groove in said second jamb to respectively match said continuous path in said first jamb; whereby said rod is guidable from its at-rest position when said lower sash is closed, across the upper face of said sill, up the weather-side of said first jamb and up the weather-side face of said second jamb to proximate to said head member;

a pair of cables attached to a cable grip serving as a handle, said cable grip being detachably attached to the room-side of said sill member with the first cable of said cable pair being guided through said sill member, said first jamb and said head member to the upper-most part of said first vertical groove where said first cable is guided down said first vertical groove and continued in said first rod guide groove to meet said rod, where said first cable is attached to said first end of said rod, and with the second cable of said cable pair being guided through said sill member, said second jamb and said head member to the upper-most part of said second vertical groove where said second cable is guided down said second vertical groove and continued in said second rod guide groove to meet said rod, where said second cable is attached to said opposing second end of said rod; wherein said cable grip, upon being detached from said sill member and relocated away from said sill member, causes said first cable and said second cable to simultaneously pull said ends of said rod along said grooves, away from said rod's said at-rest position to a fully-risen position proximate to said head member; and one or more latches to hold said rod in place when said rod is raised to said fully-risen position, said latch or latches being releasable when it is desired for said rod to return to its said at-rest position, with said return being accomplished when said rod responds to said cables being pulled by a rollup tension furnished into said self-storing roller unit;

whereby during the cleaning of said sashes, even when said sashes are tilted within said window frame, said movement of said rod to said fully-risen position causes said tube to draw said assembly of insect screen fabric and impervious membrane from off said rollup shaft to close said window frame's opening against flying insects, wind and precipitation;

wherein, when said window sashes are not tilted for cleaning, said impervious membrane is hidden from sight; and wherein, when said lower sash is not open for ventilation, said insect screen fabric and impervious membrane are hidden from sight.

2. The apparatus of claim 1, wherein:

said screen rollup assembly comprises said shafted self-storing roller unit, a second section of insect screen fabric, a second section of impervious membrane and a supplementary section of insect screen fabric;

said second section of insect screen fabric having a top horizontal end attached along the weather-side face of said lower sash's bottom rail and having a width matching the width of said lower sash and having a length approximately twice as great as the maximum distance said lower sash may travel for ventilation;

said second section of impervious membrane, being impervious to wind and precipitation and resistant to passage of light, is possessed with a width matching the width of said second section of insect screen fabric and a length at least as great as the height of the window opening from head to sill but not more than the sum of twice said height of the window opening from head to sill less the maximum distance said lower sash may travel for ventilation;

said supplementary section of insect screen fabric, having a horizontal bottom end attached to said rollup shaft and a top horizontal end attached along the bottom horizontal end of said second section of impervious membrane, said supplementary section of insect screen fabric is possessed with a width matching the width of said second section of insect screen fabric and a length such that the sum total length of said supplementary section of insect screen fabric and said second section of said impervious membrane equals at least twice the height of the window opening from head to sill plus twice the width of said head member from weather-side to room-side;

whereby, when said rod is raised to said fully-raised position, said room-side is shaded against sunlight and is furnished visual privacy; and whereby, when said rod is raised to said fully-raised position and then said lower sash is moved vertically away from said sill member from a closed position to a ventilation position, said connected sections of insect screen fabric and impervious membrane align such that ventilation air may pass through said window opening from weather-side to room-side.

* * * * *